United States Patent
Hoffman et al.

(10) Patent No.: US 7,473,360 B2
(45) Date of Patent: Jan. 6, 2009

(54) LENGTH-ADJUSTABLE FILTER CARTRIDGE END CAPS, FILTER CARTRIDGES EMPLOYING, AND METHODS OF MAKING, THE SAME

(75) Inventors: Charles S. Hoffman, Baltimore, MD (US); Charles C. Schuyler, Baltimore, MD (US); Norman F. Robillard, Whitehall, MD (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 10/105,635

(22) Filed: Mar. 26, 2002

(65) Prior Publication Data

US 2003/0183568 A1 Oct. 2, 2003

(51) Int. Cl.
*B01D 27/08* (2006.01)
(52) U.S. Cl. ...................... 210/236; 210/450
(58) Field of Classification Search ............... 210/450, 210/453–454, 470, 497.01, 493.1–493.2, 210/232, 236, 444; 156/69
See application file for complete search history.

(56) References Cited

U.S. PATENT DOCUMENTS

| | | | |
|---|---|---|---|
| 1,970,666 A | 8/1934 | Martinet | |
| 2,220,706 A | 11/1940 | Cantin | |
| 2,266,075 A | 12/1941 | Replogle | |
| 2,269,461 A | 1/1942 | Lehmberg | |
| 2,475,815 A | 7/1949 | Burd | |
| 2,726,184 A * | 12/1955 | Cox et al. ..................... | 156/69 |
| 2,789,661 A | 4/1957 | Brace | |
| 2,822,201 A * | 2/1958 | Wood ........................... | 277/637 |
| 3,078,650 A | 2/1963 | Anderson et al. | |
| 3,186,552 A * | 6/1965 | Cutler ......................... | 210/457 |
| 3,189,179 A | 6/1965 | McMichael | |
| 3,246,920 A | 4/1966 | Pall | |
| 3,344,923 A | 10/1967 | Pall et al. | |
| 3,457,339 A * | 7/1969 | Pall et al. .................... | 264/162 |
| 3,505,794 A | 4/1970 | Nutter et al. | |
| 3,633,757 A | 1/1972 | Madern | |
| 3,675,777 A * | 7/1972 | Heskett et al. .............. | 210/232 |
| 3,716,436 A | 2/1973 | Pall et al. | |
| 3,771,664 A | 11/1973 | Schrink et al. | |

(Continued)

FOREIGN PATENT DOCUMENTS

DE 2 154 363 11/1971

(Continued)

*Primary Examiner*—Terry K Cecil
(74) *Attorney, Agent, or Firm*—Leydig, Voit & Mayer, Ltd.

(57) ABSTRACT

A filter cartridge comprises a length-adjustable end cap attached to an end of a filter body. The end cap includes an annular seal, a spacer coaxially positioned in spaced relationship with the seal, and a connection member including a cylindrical neck in moveable sealing contact within the seal and in a snug sliding fit within the spacer and an imperforate flange including a seal on a radial outer region thereof. A method of joining an end cap to an end of a generally cylindrical filtration medium comprises positioning an annular spacer ring in a recess of a connection flange of an end cap; melting an exposed portion of the connection flange; contacting the melted exposed portion of the flange and an end of a filter body; and allowing the melted exposed portion to cool and bond the filter body to the end cap.

32 Claims, 8 Drawing Sheets

U.S. PATENT DOCUMENTS

| | | | |
|---|---|---|---|
| 3,850,813 A | 11/1974 | Pall et al. |
| 3,853,508 A | 12/1974 | Gordon et al. |
| 3,853,509 A | 12/1974 | Leliaert |
| 3,870,636 A | 3/1975 | Schettler |
| 3,951,630 A | 4/1976 | Kleissler, Jr. |
| 3,984,325 A | 10/1976 | Rosaen |
| 4,007,026 A | 2/1977 | Groh |
| 4,033,881 A | 7/1977 | Pall |
| RE29,447 E | 10/1977 | Farrow et al. |
| 4,075,106 A | 2/1978 | Yamazaki |
| 4,120,711 A * | 10/1978 | Gudeman ................. 156/69 |
| 4,130,487 A | 12/1978 | Hunter et al. |
| 4,133,769 A | 1/1979 | Morgan, Jr. |
| 4,138,234 A | 2/1979 | Kubesa |
| 4,154,688 A | 5/1979 | Pall |
| 4,174,282 A | 11/1979 | Butterworth |
| 4,184,966 A | 1/1980 | Pall |
| 4,186,099 A | 1/1980 | Henschel, Jr. et al. |
| 4,211,543 A | 7/1980 | Tokar et al. |
| 4,228,012 A | 10/1980 | Pall |
| 4,252,591 A | 2/1981 | Rosenberg |
| 4,419,240 A * | 12/1983 | Rosaen ................. 210/444 |
| 4,422,790 A | 12/1983 | Gebert et al. |
| 4,445,915 A | 5/1984 | Robinson |
| 4,464,263 A | 8/1984 | Brownell |
| 4,517,085 A | 5/1985 | Driscoll et al. |
| 4,522,719 A | 6/1985 | Kuwajima et al. |
| 4,559,138 A | 12/1985 | Harms, II |
| 4,581,050 A | 4/1986 | Krantz |
| 4,608,173 A * | 8/1986 | Watanabe et al. ........ 210/502.1 |
| 4,609,465 A | 9/1986 | Miller |
| 4,634,527 A | 1/1987 | Marshall |
| 4,659,467 A | 4/1987 | Spearman |
| 4,669,167 A | 6/1987 | Asterlin |
| 4,680,118 A | 7/1987 | Taga |
| 4,733,449 A | 3/1988 | Spearman |
| 4,735,638 A | 4/1988 | Ciliberti et al. |
| 4,756,727 A | 7/1988 | Howeth |
| 4,775,469 A | 10/1988 | Zimmerly |
| 4,814,033 A | 3/1989 | Spearman et al. |
| 4,836,931 A | 6/1989 | Spearman et al. |
| 4,839,048 A | 6/1989 | Reed et al. |
| 4,867,043 A | 9/1989 | Antkowiak |
| 4,878,930 A | 11/1989 | Manniso et al. |
| 4,936,883 A | 6/1990 | Larsson et al. |
| 4,946,598 A | 8/1990 | Murphy et al. |
| 4,956,089 A * | 9/1990 | Hurst .................. 210/484 |
| 4,959,045 A | 9/1990 | Hartley et al. |
| 4,961,846 A | 10/1990 | Isakson |
| 4,986,912 A | 1/1991 | Fisch |
| 5,006,235 A | 4/1991 | Cooper |
| 5,015,375 A | 5/1991 | Fleck |
| 5,015,376 A | 5/1991 | Picek |
| 5,045,194 A | 9/1991 | Gershenson |
| 5,102,545 A | 4/1992 | Hoffmann |
| 5,104,429 A | 4/1992 | Miller |
| 5,141,637 A | 8/1992 | Reed et al. |
| 5,192,424 A | 3/1993 | Beyne et al. |
| 5,238,717 A | 8/1993 | Boylan |
| 5,250,179 A | 10/1993 | Spearman |
| 5,284,997 A | 2/1994 | Spearman et al. |
| 5,332,410 A | 7/1994 | Heybutzki et al. |
| 5,344,559 A | 9/1994 | Van Ooijen |
| 5,360,650 A | 11/1994 | Grimes |
| 5,376,270 A | 12/1994 | Spearman |
| 5,376,272 A | 12/1994 | Spearman |
| 5,435,915 A | 7/1995 | Connors, Jr. |
| 5,472,537 A * | 12/1995 | Friel et al. ................. 156/69 |
| 5,478,469 A | 12/1995 | Bryan et al. |
| 5,527,463 A | 6/1996 | Morgan, Jr. |
| 5,543,047 A | 8/1996 | Stoyell et al. |
| 5,545,323 A * | 8/1996 | Koehler et al. ........... 210/493.2 |
| 5,591,335 A * | 1/1997 | Barboza et al. .......... 210/323.2 |
| 5,601,717 A | 2/1997 | Villette et al. |
| 5,678,230 A | 10/1997 | Bryan et al. |
| 5,779,903 A | 7/1998 | Smith et al. |
| 5,851,267 A | 12/1998 | Schwartz |
| 6,099,729 A * | 8/2000 | Cella et al. .................. 210/315 |
| 6,146,527 A * | 11/2000 | Oelschlaegel ............... 210/232 |
| 6,224,767 B1 | 5/2001 | Fujiwara et al. |
| 6,342,283 B1 * | 1/2002 | Mozelack et al. .......... 428/36.9 |
| 6,495,037 B1 * | 12/2002 | Schuyler ..................... 210/232 |

FOREIGN PATENT DOCUMENTS

| | | |
|---|---|---|
| EP | 0 441 045 A2 | 8/1991 |
| EP | 0 475 708 A1 | 3/1992 |
| EP | 0 487 831 A1 | 6/1992 |
| EP | 0 588 525 A1 | 3/1994 |
| FR | 2 490 060 | 9/1981 |
| GB | 2163368 A * | 2/1986 |
| GB | 2 192 810 | 1/1988 |
| WO | WO 97/24169 | 7/1977 |
| WO | WO97/24169 * | 7/1997 |

* cited by examiner

LENGTH-ADJUSTABLE FILTER CARTRIDGE END CAPS, FILTER CARTRIDGES EMPLOYING, AND METHODS OF MAKING, THE SAME

FIELD OF THE INVENTION

The present invention relates generally to the field of filter cartridges. More particularly, the present invention relates to length-adjustable filter cartridge end-caps and to filter cartridges which include such length-adjustable end caps.

BACKGROUND AND SUMMARY OF THE INVENTION

Manufacturers of industrial disposable rigid filter cartridges have for many years essentially standardized filter cartridge diameter and length dimensions and geometries. As a result, the filter cartridges produced by virtually every manufacturer are capable of being employed in another manufacturer's cartridge housing. Nonetheless, there still exists a need for non-standardized filter cartridges to be provided to the industry. For example, the standardized filter cartridge geometry may not be entirely sufficient for use in large filtration installations and/or to filter heavily contaminated fluids. While higher capacity filter cartridge geometries can be envisioned, their commercial acceptance is limited due to the costs associated with the replacement of existing filter cartridge housings designed for use with the conventional standardized filter cartridge geometries.

In now abandoned U.S. application Ser. No. 09/988,222 filed on Nov. 19, 2001, and published under International Publication No. WO03/043714A1, the entire content of which is expressly incorporated hereinto by reference and will be hereinafter referred to as "the '222 application", there are disclosed novel length-adjustable filter cartridges having at least one length-adjustable end cap attached to an end of the filter body. The length-adjustable end cap most preferably includes an annular stationary ring member which is attached to one end of the filter body, and a moveable connection member slideably received within the annular stationary ring member so as to be moveable longitudinally relative thereto.

While the end caps and filter cartridges disclosed and claimed in the '222 application are entirely satisfactory, some improvements thereto may still be desired. For example, during the manufacture of the filter cartridges by thermally bonding the end caps to the cylindrical filtration medium, the provision of a separate O-ring seal may be problematic thereby leading to production difficulties. As such, it would be highly desirable if the annular stationary ring member that is thermally bonded to the filter medium could be provided with an annular seal that was formed as a one-piece (unitary) structure therewith. Moreover, it would be desirable if such a seal could be thermally protected during the thermal bonding procedures.

According to the present invention, length-adjustable end caps and filter cartridges including the same are provided. In preferred embodiments, the length-adjustable end caps include a stationary ring member which includes an annular seal, e.g., a lip seal, a spacer coaxially positioned in spaced relationship with the seal, e.g., spaced below the seal, and a connection member in moveable sealing contact with the lip seal and in a sliding fit with the spacer. The connection member includes an outwardly extending flange having an outer region which includes a sealing arrangement. Most preferably, the lip seal is unitary with the stationary ring member and is a segment of a conical surface and thereby has a proximal edge region which is unitarily joined to the ring member and an opposite distal terminal end which projects downwardly and inwardly into the opening defined by the ring member. The stationary ring member preferably includes a connection flange which defines an annular recess concentric with, but spaced from, the unitary lip seal. The spacer may include an annular spacer ring which is received within the recess. During thermal bonding of the connection flange to an end of a generally cylindrical filter medium, the spacer ring and the end of the filter medium will both be thermally melded to respective adjacent portions of the connection flange. As such, the spacer ring will be integrally fused to the ring member.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
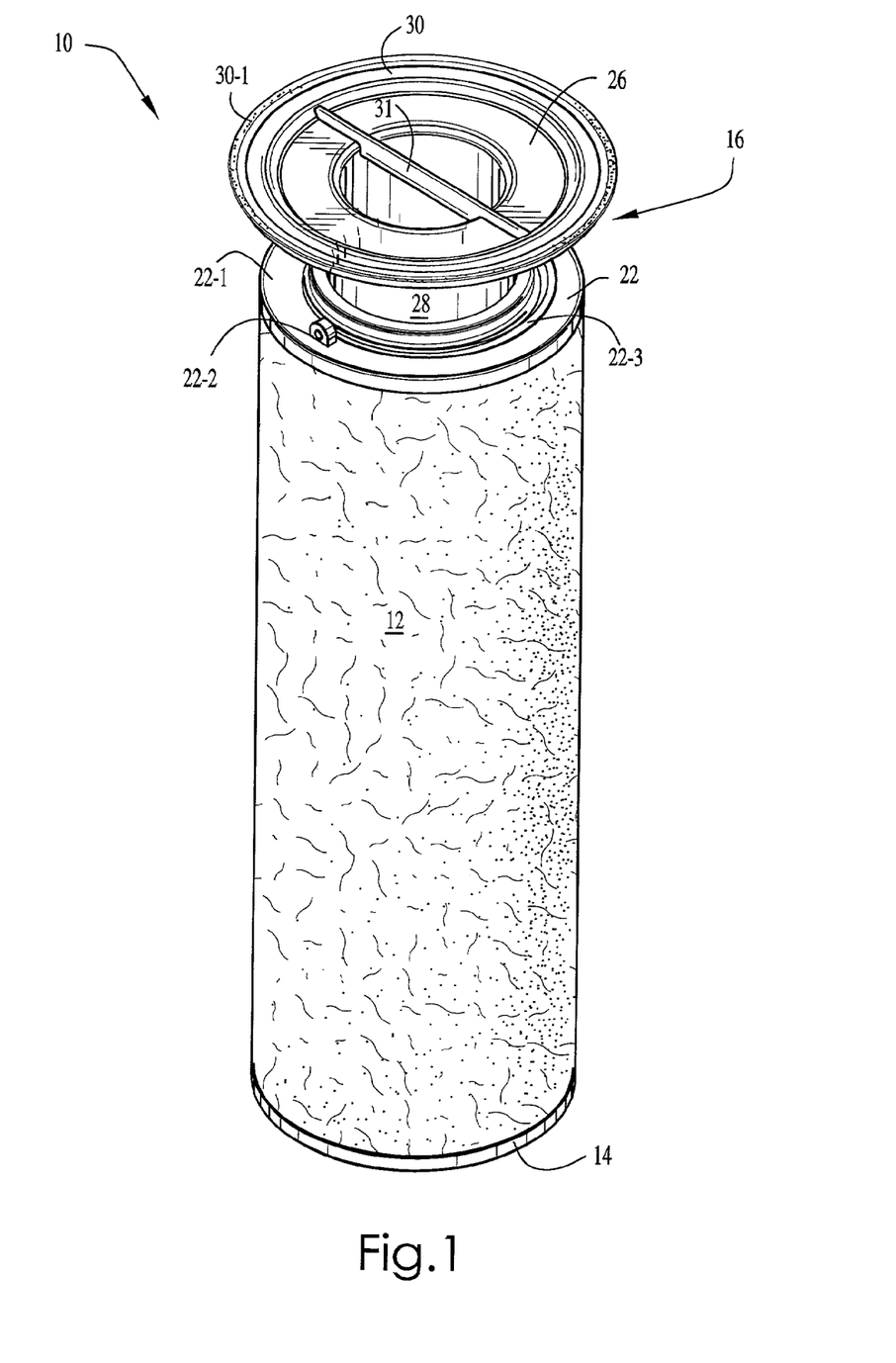
FIG. 1 is perspective view of a filter cartridge employing a length-adjustable end cap according to the present invention.

Accompanying FIG. 1 depicts a particularly preferred filter cartridge 10 in accordance with the present invention. As shown, the filter cartridge 10 includes a generally cylindrical filter body 12 which is closed at one end by a bottom end cap 14. A length-adjustable end-cap 16 is joined to the upper end of the filter body 12.

The filter body 12 may be formed of virtually any filtration media conventionally employed to filter fluids. Thus, for example, the filtration media may be comprised of pleated sheets of non-woven or woven filter materials which are, in and of themselves, highly conventional in the fluid filtration art. Most preferably, however, the filter body 12 is comprised of a generally cylindrical, non-woven mass of melt-blown polymeric fibers formed, for example, from thermoplastic polymers, preferably polyolefins such as polypropylene, polyethylene and the like. Especially preferred filter media for use as the filter body 12 in accordance with the present invention are those as described more fully in commonly owned U.S. Pat. Nos. 5,591,335 and 6,342,283, the entire content of each being expressly incorporated hereinto by reference.

Figure 2:
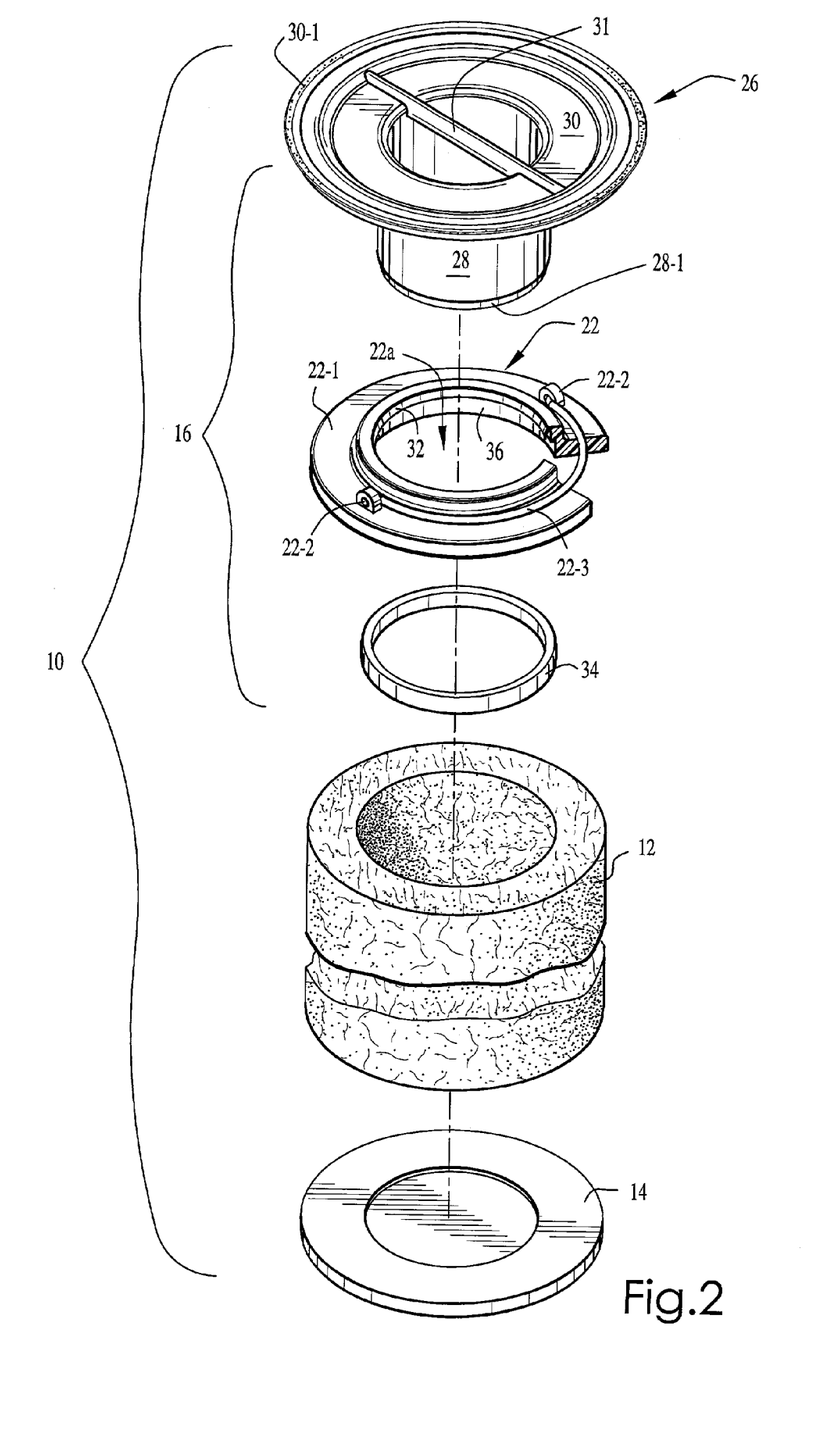
FIG. 2 is an exploded perspective view of the filter cartridge and length-adjustable end cap depicted in FIG. 1.
Figure 3:
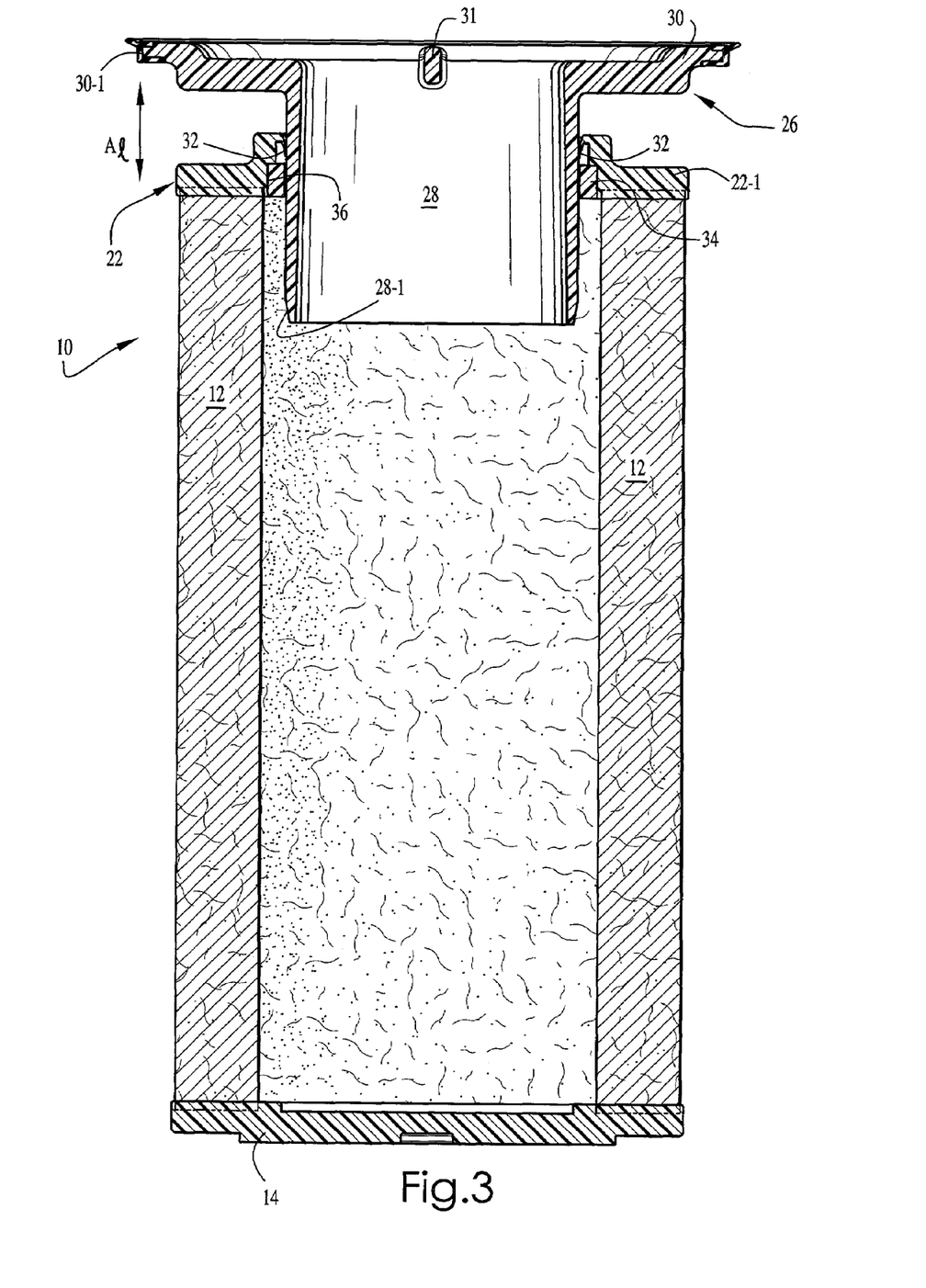
FIG. 3 is an enlarged cross-sectional view of the filter cartridge and length-adjustable end cap depicted in FIG. 1.
Figure 4:
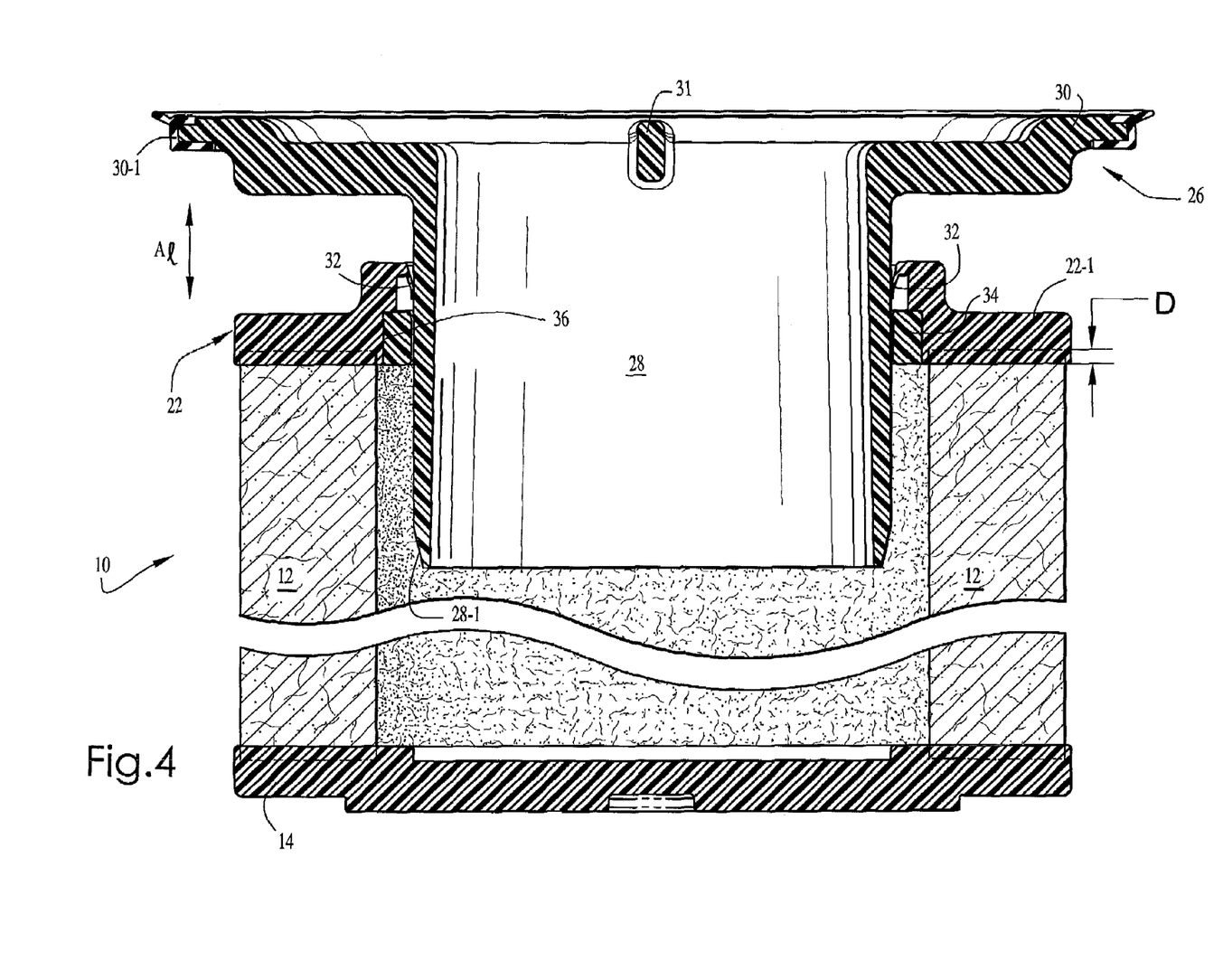
FIG. 4 is a greatly enlarged cross-sectional elevational view particularly showing the length-adjustable end cap in accordance with the present invention.

As is perhaps more clearly shown in accompanying FIGS. 2-4, the length-adjustable end cap 16 includes an annular stationary ring member 22 having an annular connection flange 22-1 which is physically attached to the end surface of the filter body 12 most preferably by thermal bonding (i.e., heat welding) in a manner to be described below.

A moveable connection member 26 includes a lower cylindrical neck portion 28 and an upper annular flange portion 30. The flange portion 30 will typically be provided with an elastomeric edge seal 30-1 so as to provide a fluid seal between the flange 30 and adjacent structural components of a housing (not shown) in which the filter cartridge 10 is employed. Most preferably, the neck and flange portions 28, 30 are formed as a unitary (one-piece) structure and provided with a cross-support 31 so as to increase the structural integrity of the same while yet providing a convenient fixed handle to allow removal/insertion of the connection member 28 relative to the circular interior opening 22a defined by the stationary ring member 22 (see FIG. 2). The neck portion 28 is received within, and is slideable with respect to, the annular stationary ring member 22 as shown by the arrows $A_l$ in FIGS. 3 and 4. Thus, the entire connection member 26 is slideable along the longitudinal axis of the filter cartridge 10 so that the flange portion 30 thereof may be moved towards and away from the stationary ring member 22.

Important to the present invention is the provision of an annular inwardly projecting flexible lip seal 32 which is formed as a unitary (one piece) structure with the stationary ring member 22. An annular spacer ring 34 is coaxially positioned in spaced relationship below the lip seal 32 and is seated in a partly conformingly shaped recess 36 (see FIG. 2) formed in a lower region of the connection flange 22-1 of the stationary ring member 22. As will be described below, the spacer flange 34 serves to protect the lip seal 32 during the thermal bonding operation and also serves to ensure that a relatively snug, but sliding, fit is established with the exterior circumferential surface of cylindrical neck portion 28 of the moveable connection member 26. However, during the thermal bonding operation, a portion of the spacer flange 34 is physically melded with the adjacent region of the connection flange 22-1 of the stationary ring member 22 so as to be integrally fused therewith. As such, no separate fluid seal structure is needed as between the spacer flange 32 and the recess 34 of the stationary ring member 22 in which it is seated.

The lip seal 22 may be formed of virtually any desired geometric configuration which projects inwardly, and preferably downwardly, so as to constrict the opening 22a in which the neck portion 28 is inserted. The lip seal 22 must, of course, be capable of being yieldably outwardly flexed somewhat when in contact with the outer surface of the neck portion 28 so as to thereby maintain sealing contact therewith. Fluid pressure will also serve to urge the lip seal 32 into sealing contact with the neck portion 28 due to the interior of the filter medium 12 being at a greater fluid pressure as compared to the fluid pressure on the exterior of the filter medium 12 (e.g., due to the inside-out flow of the fluid being filtered and the filter drop across the radial thickness dimension of the filter medium). Most preferably, the lip seal 22 is in the form of a generally conical segment oriented in an inward and downward direction (i.e., in a slanted direction from the ring member 22 toward the bottom end cap 14).

Most preferably, the terminal (lower) end of the neck portion 28 is provided with an exterior circumferential bevel 28-1 which assists in the positioning of the neck portion 28 within the stationary ring member. That is, the circumferential bevel 28-1 provides a pilot surface to allow the neck portion to be properly positioned with respect to the annular lip seal 32 so that the neck portion may be inserted within the stationary ring member 22.

It is preferred that the moveable connection member 26 be capable of being physically removed from the stationary ring member 22. For such purpose, the cross-support 31 provides a convenient handle to allow the connection member 26 to be withdrawn from the ring member 22 while the latter remains associated with its supporting structure (for example, a filter housing). Because the weight of the filter body 12 will be substantially increased due to the presence of trapped particulates that have been removed from the filtered fluid during use, it is preferable that the stationary ring 22 also be provided with a diametrically opposed pair of bail ears 22-2 which pivotally accept the terminal ends of a semi-circular bail 22-3. Thus, upon removal of the connection member 26, the remaining structural portions of the filter cartridge 10 may be removed physically from its adjacent supporting structure (e.g., a filter housing, not shown) by manually lifting it with the aid of the bail 22-3.

Figure 5A:
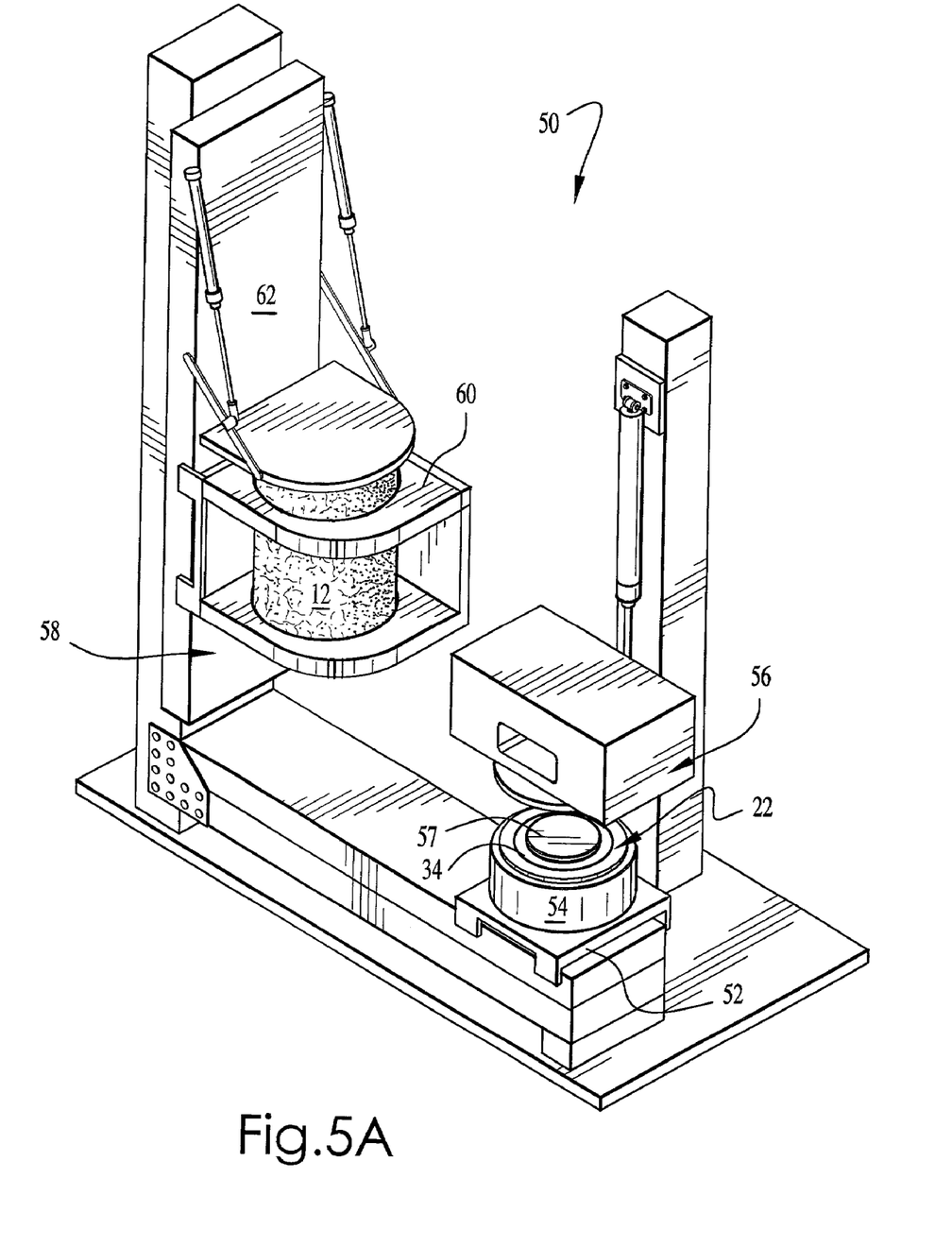
FIGS. 5A-5D are perspective views of a system and a preferred operational sequence for thermally bonding the end cap to a cylindrical filtration medium to manufacture filter cartridges in accordance with the present invention.

Accompanying FIGS. 5A-5D depict a preferred system 50 and technique whereby end caps may be thermally bonded to a cylindrical filter body 12. In this regard, as shown in FIG. 5A, the system includes a carriage 52 on which provides a platform to support a nest 54 holding a stationary ring member 22 in an inverted manner. Thus, the bottom surface of the ring member 22 and the spacer ring 34 are exposed to the heating station 56. Prior to being heated, a generally cylindrical heat shield puck 57 is positioned removably within the interior of the end cap. The heat shield puck 57 serves to protect the unitary lip seal of the ring member 22 during the thermal bonding operation. The carriage 52 is capable of reciprocal rectilinear movements between the heating station 56 and the bonding station 58 so as to shuttle the nest 54 and the inverted ring member 22 therebetween.

Figure 5B:
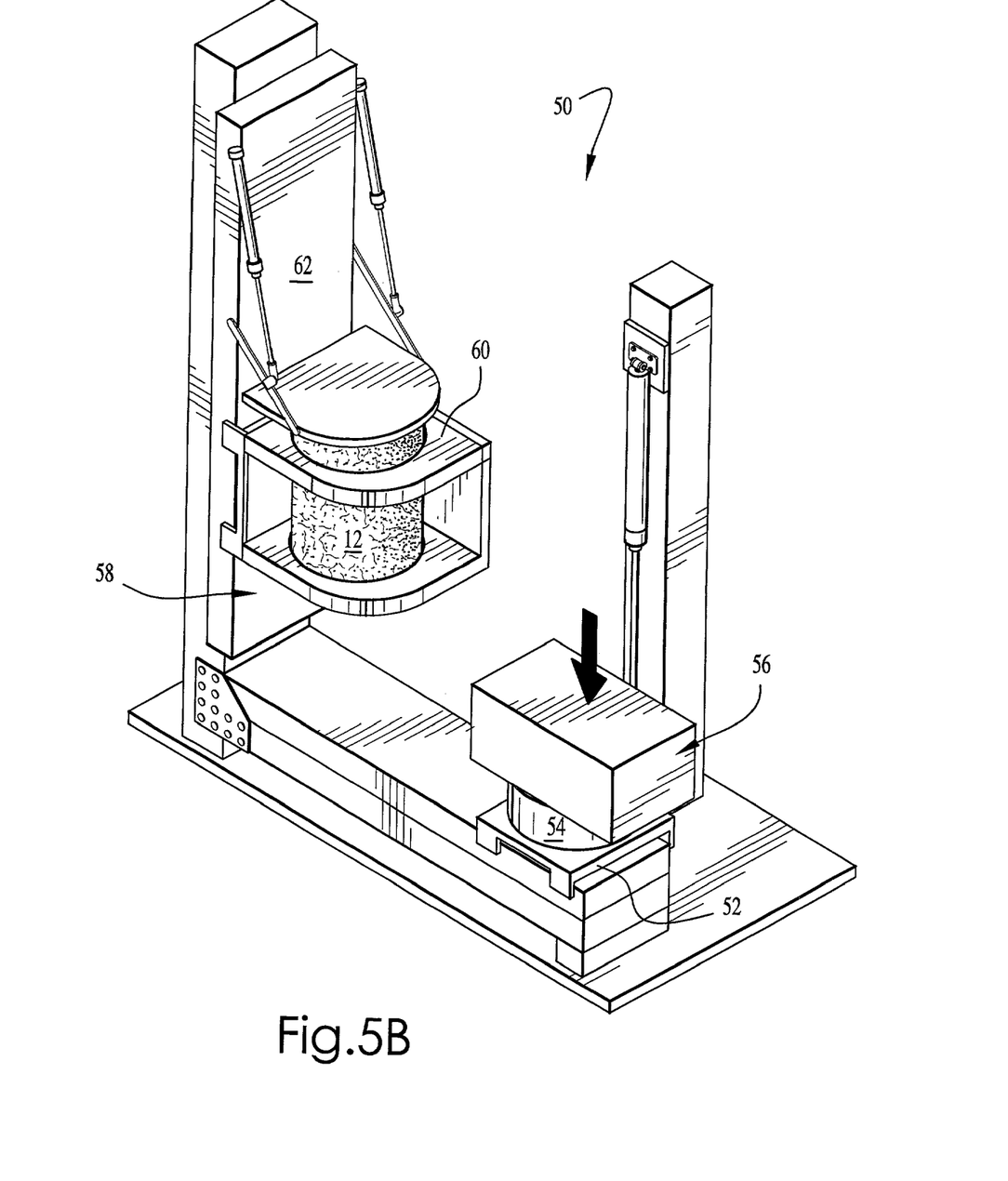
Figure 5C:
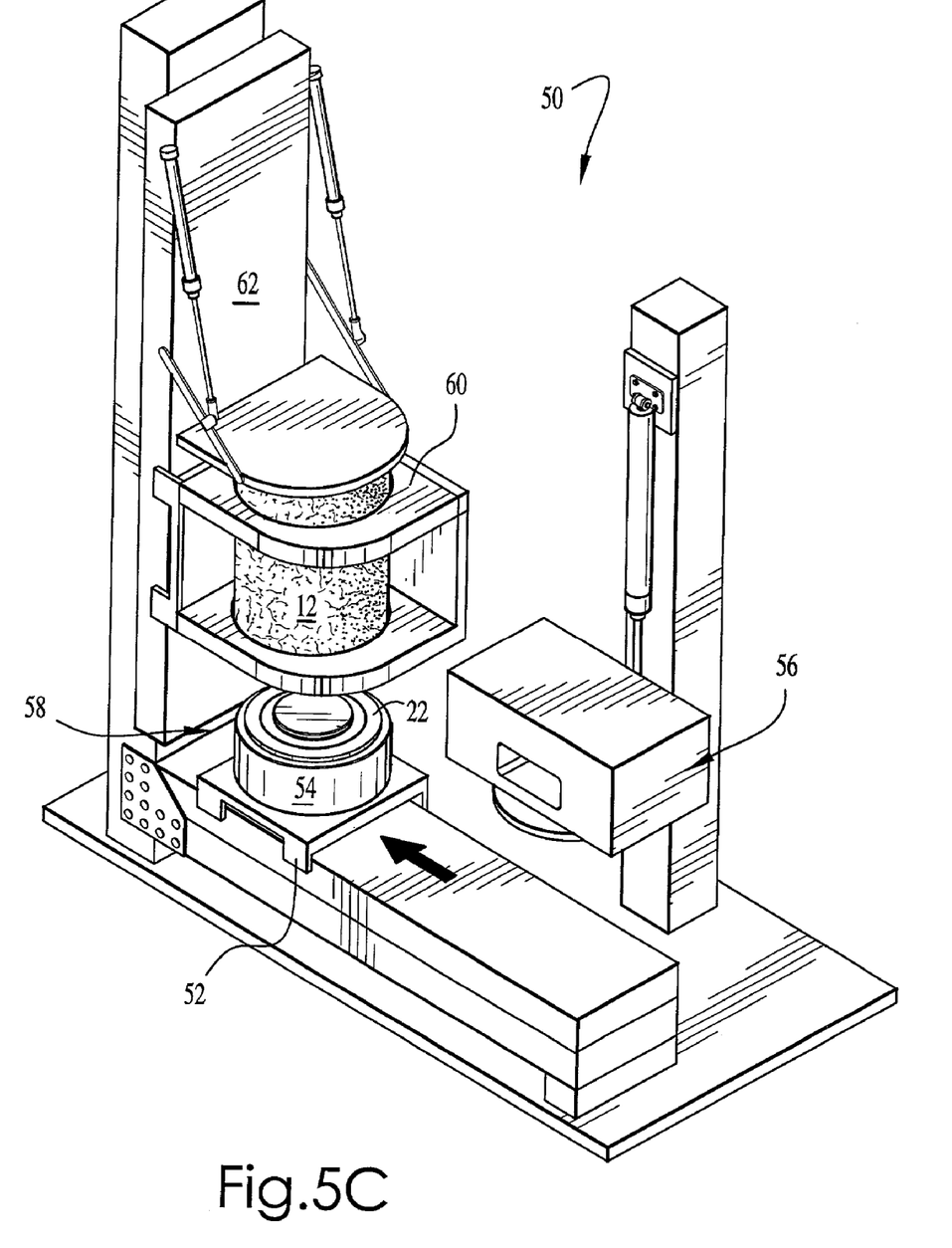

As shown in FIG. 5B, with the ring member 22 positioned in the manner depicted in FIG. 5A, the heating station is moveable into thermal contact with the nest 54 and the inverted ring member 22 held therein so as to melt a portion of the connection flange 22-1 which is exposed to the heating station 56. The exposed portion of the spacer ring 34 is also concurrently melted at this time. After the respective portions of the connection flange 22-1 and spacer ring 34 are rendered molten, the heating station 56 is raised and the carriage 52 is shuttled to the bonding station 58 so as to be in coaxial alignment with the filter body 12 held in support structure 60. Such a state is shown in FIG. 5C. It will be observed in this regard that the spacer ring 34 has thermally melded with an adjacent surrounding portion of the flange 22-1.

Figure 5D:
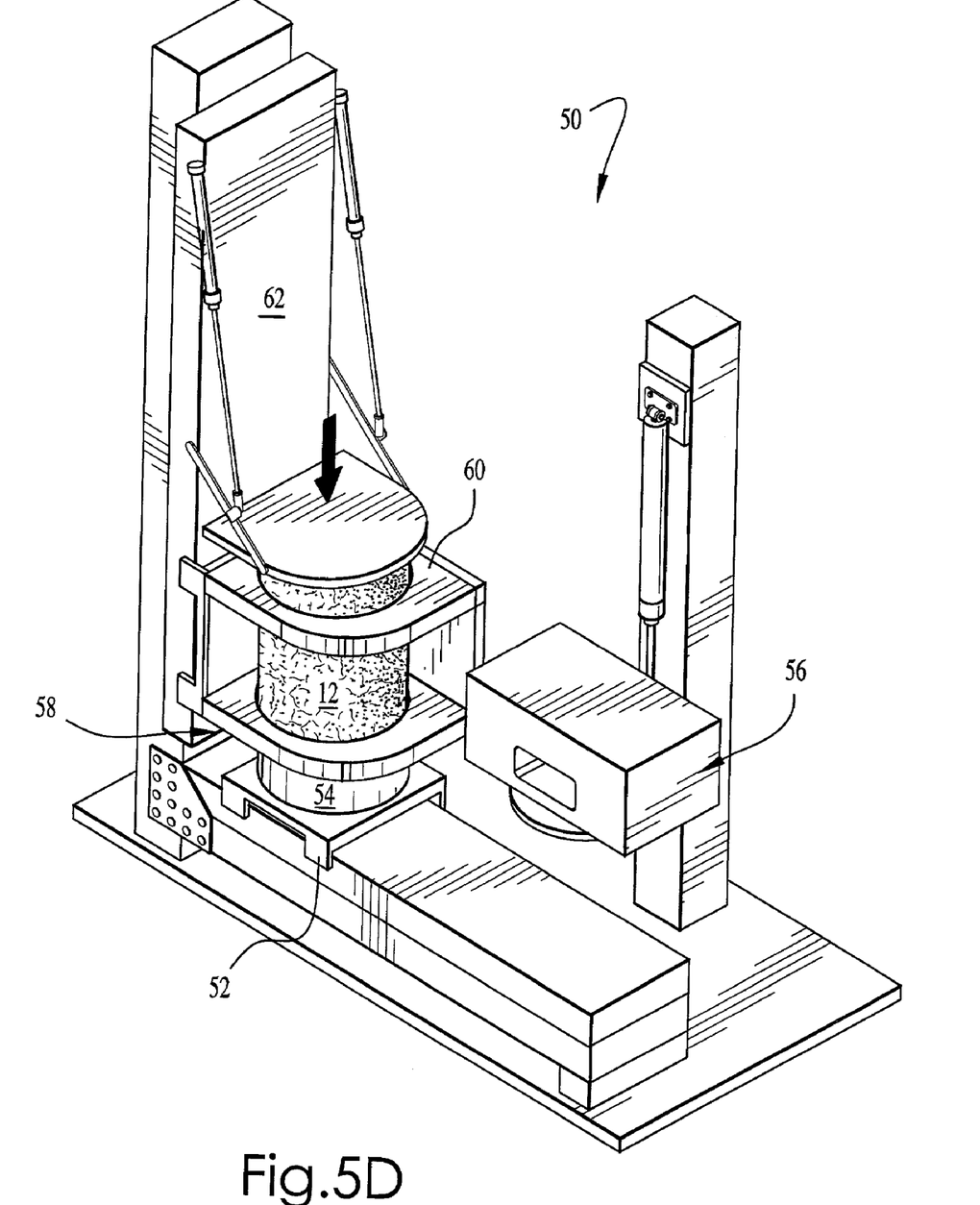

An end of the filter body 12 is then brought into contact with the melted region of the flange 22-1 by lowering of the support structure 60 along vertical support post 62 as shown in FIG. 5D. Upon cooling, therefore, the filter body 12 and the connection flange 22-1 are thermally melded so as to form an integral structure. Most preferably, the end of the filter body 12 is embedded physically within, and melded to, the flange 22-1 to a thickness dimension D (see FIG. 4) of at least about 0.100 inch, and more preferably between about 0.100 to about 0.125 inch. In such a manner, an integral fluid-tight bond is established between the end of the filter body 12 and the flange 22-1 associated with the stationary retaining ring 22. The bottom end cap 14 may be thermally bonded to the other end of the filter body 12 in a similar fashion to that described above with reference to FIGS. 5A-5D.

While the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A filter cartridge comprising a generally cylindrical filter body having an interior and a fluid-filtration media, and at least one length-adjustable end cap, wherein said end cap comprises a stationary ring member which is attached to an end of said filter body and includes an interior opening and an annular seal, a spacer coaxially positioned in spaced relationship with the seal, and a moveable connection member which includes a cylindrical neck portion and flange portion, wherein the spacer is joined to the stationary ring member around the interior opening and is positioned below the seal, wherein the cylindrical neck portion is slideably received within the interior opening of said stationary ring member and extends downwardly in moveable sealing contact within said seal and in a sliding fit within said spacer into the interior of the filter body, the cylindrical neck portion defining an opening which fluidly communicates with the interior of the filter body, and wherein the flange portion extends radially outwardly from the cylindrical neck portion to a radially outer region which includes a sealing arrangement, the flange portion being imperforate and having a larger outer diameter than the outer diameters of the cylindrical filter body and the stationary ring member.

2. The filter cartridge of claim 1, wherein the sealing arrangement comprises a seal.

3. The filter cartridge of claim 1, wherein the seal of the stationary ring member comprises a lip seal.

4. The filter cartridge of claim 3, wherein said lip seal is a segment of a conical surface.

5. The filter cartridge of claim 1, wherein the outer region of the flange portion comprises an edge region.

6. The filter cartridge of claim 1, wherein said filter body includes a non-woven mass of melt-blown polymeric fibers, wherein said stationary ring member includes an annular connection flange, and wherein an end of said filter body is thermally melded to an adjacent portion of said connection flange so as to be integrally embedded within a corresponding depth portion thereof.

7. The filter cartridge of claim 6, wherein said connection flange of said stationary ring member defines an annular recess concentric with, but spaced from, said seal, and wherein said spacer further includes an annular spacer ring received within said recess.

8. The filter cartridge of claim 7, wherein said spacer ring is thermally melded with an adjacent portion of said connection flange.

9. The filter cartridge of claim 1, wherein said stationary ring member includes a connection flange which defines an annular recess concentric with, but spaced from, said seal, and wherein said spacer includes an annular spacer ring received within said recess.

10. The filter cartridge of claim 9, wherein said spacer ring is thermally melded with an adjacent portion of said connection flange.

11. The filter cartridge of claim 1, wherein said neck portion has a terminal beveled end opposite the flange portion.

12. The filter cartridge of claim 1, wherein the sealing arrangement of the movable connector member comprises a seal and the outer region of the flange portion comprises an edge region and wherein the seal of the stationary ring member comprises a lip seal unitarily formed with the stationary ring member.

13. A filter cartridge comprising:
a filter body which defines a generally cylindrical interior space;
a length-adjustable top end cap attached to an upper end of said filter body;
a bottom end cap attached to a lower end of said filter body so as to close said interior space thereat;
wherein said length-adjustable top end cap includes:
(i) a stationary ring member having an annular connection flange integrally joined at one end to said upper end of said filter body; and
(ii) a moveable member having a generally transverse annular support flange and a cylindrical neck member integrally depending from said support flange and defining an opening to allow fluid-communication with said interior space of said filter body, the support flange being imperforate, extending radially outwardly from the neck member to a radially outer region which includes a sealing arrangement, and having a larger outer diameter than the outer diameters of the filter body and the stationary ring member, wherein
(iii) said stationary ring member includes a unitary annular lip seal and a spacer coaxially positioned in spaced relationship below the lip seal and joined around the interior of the annular connection flange; and wherein
(iv) said neck member is slideably received within said stationary ring member so as to be in sealing contact within said lip seal and in a sliding fit within said spacer of said stationary ring member and to extend into the interior space of the filter body.

14. The filter cartridge of claim 13, wherein said lip seal is a segment of a conical surface.

15. The filter cartridge of claim 13, wherein said moveable connection member includes a cross support.

16. The filter cartridge of claim 13, wherein said filter body includes a non-woven mass of melt-blown polymeric fibers.

17. The filter cartridge of claim 16, wherein said upper end of said filter body is thermally melded to an adjacent portion of said connection flange so as to be integrally embedded within a corresponding depth portion thereof.

18. The filter cartridge of claim 17, wherein said connection flange of said stationary ring member defines an annular recess concentric with, but spaced from, said lip seal, and wherein said spacer includes an annular spacer ring received within said recess.

19. The filter cartridge of claim 18, wherein said spacer ring is thermally melded with an adjacent portion of said connection flange.

20. The filter cartridge of claim 13, wherein said connection flange of said stationary ring member defines an annular recess concentric with, but spaced from, said lip seal, and wherein said spacer includes an annular spacer ring received within said recess.

21. The filter cartridge of claim 20, wherein said spacer ring is thermally melded with an adjacent depth portion of said connection flange.

22. The filter cartridge of claim 13, wherein the outer portion of the support flange comprises an edge region.

23. The filter cartridge of claim 13, wherein the sealing arrangement comprises a seal.

24. A length-adjustable end cap for a filter cartridge comprising a stationary ring member which includes an annular connection flange capable of being bonded to an end of a filter body, an annular seal, and a spacer coaxially positioned in spaced relationship below the seal and fitted around the interior of the annular connection flange, and a moveable connection member which includes a hollow cylindrical neck portion and a flange portion, wherein the hollow cylindrical neck portion is in moveable sealing contact within said seal and in a sliding fit within the spacer, the hollow cylindrical neck portion defining an opening and extending through the end cap and into the interior of the filter body, and wherein the flange portion is imperforate, extends radially outwardly from one end of the hollow cylindrical neck portion to a radially outer region which includes a sealing arrangement, and has a larger outer diameter than the outer diameter of the stationary ring member.

25. The end cap of claim 24, wherein the seal of the stationary ring member comprises a lip seal.

26. The end cap of claim 24, wherein the sealing arrangement of the flange portion of the moveable connection member includes a seal.

27. The end cap of claim 24, wherein said annular connection flange defines an annular recess concentric with, but spaced from, said seal, and wherein said spacer includes an annular spacer ring received within said recess.

28. The end cap of claim 24, wherein the outer region of the flange portion of the moveable connection member comprises an edge region.

29. A filter cartridge comprising a generally cylindrical filter body having an interior and at least one length-adjustable end cap, wherein the filter body includes a fluid filtration media and an end and wherein the length-adjustable end cap includes a stationary ring member and a movable connection member, the stationary ring member including an annular connection flange attached to the end of the filter body, an annular seal, and a spacer coaxially positioned in spaced relationship below the seal and joined around the interior of the annular connection flange and the movable connection member including a cylindrical neck portion and a flange portion, wherein the cylindrical neck portion defines an opening which fluidly communicates with the interior of the filter body, is slideably received within the annular seal and the spacer, is in movable sealing contact with the seal, has a sliding fit with the spacer, and extends into the interior of the filter body and wherein the flange portion is imperforate, extends radially outwardly from one end of the cylindrical neck portion to a radially outer region which includes a sealing arrangement, and has a larger outer diameter than the outer diameters of the filter body and the stationary ring member.

30. The filter cartridge of claim 29 wherein the annular seal of the stationary ring member includes a lip seal.

31. The filter cartridge of claim 29 wherein the sealing arrangement of the moveable connection member includes a seal.

32. The filter cartridge of claim 29 wherein the spacer comprises a spacer ring bonded within a recess in the stationary ring member.

\* \* \* \* \*